(12) United States Patent
Sawada et al.

(10) Patent No.: US 12,537,243 B2
(45) Date of Patent: Jan. 27, 2026

(54) ELECTRICITY STORAGE MODULE WITH A SHEET-LIKE HEATING ELEMENT FOR HEATING ELECTRICITY STORAGE DEVICES

(71) Applicant: Panasonic Intellectual Property Management Co., Ltd., Osaka (JP)

(72) Inventors: Koichi Sawada, Osaka (JP); Hirotaka Ogino, Osaka (JP); Duoduo Xie, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 173 days.

(21) Appl. No.: 17/419,178

(22) PCT Filed: Dec. 27, 2019

(86) PCT No.: PCT/JP2019/051366
§ 371 (c)(1),
(2) Date: Jun. 28, 2021

(87) PCT Pub. No.: WO2020/138396
PCT Pub. Date: Jul. 2, 2020

(65) Prior Publication Data
US 2022/0102776 A1  Mar. 31, 2022

(30) Foreign Application Priority Data

Dec. 28, 2018  (JP) .................................. 2018-246841
Dec. 28, 2018  (JP) .................................. 2018-246842

(51) Int. Cl.
*H01M 10/6555* (2014.01)
*H01M 10/615* (2014.01)
(Continued)

(52) U.S. Cl.
CPC ..... *H01M 10/6555* (2015.04); *H01M 10/615* (2015.04); *H01M 10/643* (2015.04);
(Continued)

(58) Field of Classification Search
CPC ........... H01M 10/6555; H01M 10/615; H01M 10/643; H01M 10/653; H01M 10/6571;
(Continued)

(56) References Cited

U.S. PATENT DOCUMENTS 5,948,298 A * 9/1999 Ijaz .......................... B60L 50/51
180/68.5
2016/0072161 A1* 3/2016 Nubbe ................ H01M 50/213
429/62

FOREIGN PATENT DOCUMENTS

JP  2011-049013 A  3/2011
JP  2012-243535    12/2012
(Continued)

OTHER PUBLICATIONS

Resinlibrary, "Polyester Resin", Apr. 13, 2023 (Year: 2022).*
(Continued)

*Primary Examiner* — Jimmy Vo
(74) *Attorney, Agent, or Firm* — Rimon P.C.

(57) ABSTRACT

A power storage module of the present disclosure includes a plurality of power storage devices formed into a tube-like shape; and a sheet-like heating element for heating the plurality of power storage devices, wherein each of the plurality of power storage devices has a tube-like case, the plurality of power storage devices are arranged such that central axes of the cases are parallel to each other, the heating element has a plurality of contact portions that are in continuous contact with side peripheral surfaces of the
(Continued)

plurality of power storage devices, and a wrap angle of the plurality of contact portions and the power storage devices is greater than 180°.

14 Claims, 8 Drawing Sheets

(51) Int. Cl.
*H01M 10/643* (2014.01)
*H01M 10/653* (2014.01)
*H01M 10/6571* (2014.01)
*H01M 10/658* (2014.01)
*H01M 50/213* (2021.01)
*H01M 50/24* (2021.01)
*H01M 50/249* (2021.01)

(52) U.S. Cl.
CPC ..... *H01M 10/653* (2015.04); *H01M 10/6571* (2015.04); *H01M 10/658* (2015.04); *H01M 50/213* (2021.01); *H01M 50/24* (2021.01); *H01M 50/249* (2021.01)

(58) Field of Classification Search
CPC .. H01M 10/658; H01M 50/249; H01M 50/24; H01M 50/213
See application file for complete search history.

(56) References Cited

FOREIGN PATENT DOCUMENTS

| JP | 2012243535 A | * 12/2012 |
| JP | 2016-207569 | 12/2016 |
| JP | 2016207569 A | * 12/2016 |

OTHER PUBLICATIONS

JP 2012243535 English Translation (Year: 2012).*
JP 2016207569 English Translation (Year: 2016).*
International Search Report Issued in corresponding International Patent Application No. PCT/JP2019/051366, dated Feb. 4, 2020, with English translation.

* cited by examiner

ELECTRICITY STORAGE MODULE WITH A SHEET-LIKE HEATING ELEMENT FOR HEATING ELECTRICITY STORAGE DEVICES

CROSS-REFERENCE OF RELATED APPLICATIONS

This application is the U.S. National Phase under 35 U.S.C. § 371 of International Patent Application No. PCT/JP2019/051366, filed on Dec. 27, 2019, which in turn claims the benefit of Japanese Application Nos. 2018-246842 and 2018-246841, both filed on Dec. 28, 2018, the entire disclosures of which Applications are incorporated by reference herein.

TECHNICAL FIELD

The present disclosure relates to a power storage module.

BACKGROUND ART

Examples of a power storage module include a battery pack in which a plurality of secondary batteries are connected in series and/or in parallel. The battery pack has been used as a power source for an electric scooter or an electrically assisted bicycle, a power supply device for an electric vehicle, or the like. Such power supply devices are used outdoors. Hence, they are likely to be affected by the environmental temperature. In particular, chemical reactions are utilized to generate power in secondary batteries. Accordingly, charging and discharging cannot be performed at a low temperature, and the load on the battery cells increases, resulting in the problem of shortening the life of the battery cells occur. In order to prevent this, it is necessary to warm up the battery cells. For example, in a battery pack intended for use in low-temperature environment such as in winter or a cold region, a plurality of battery cells may be preheated using a heater or the like prior to use. For heating such battery cells, a heating element that generates heat by energization is used.

Patent Document 1 discloses a battery pack as an example of a power storage device. In the battery pack, a plurality of cylindrical secondary batteries are arranged in a matrix having seven columns and fourteen rows (with adjacent battery cells forming squares), a sheet-like heating element is arranged in a zigzag manner with respect to the battery cells in the respective rows, and is in contact with side surfaces of the battery cells to heat the battery cells.

CITATION LIST

Patent Document

Patent Document 1: Japanese Unexamined Patent Publication No. 2012-243535

SUMMARY OF THE INVENTION

Technical Problem

However, according to the invention disclosed in Patent Document 1, when the heating element is not folded and, in this state, brought into contact with the side surface of each battery, the heating element is merely in contact with the side surface of each battery cell at less than a half of an area of the side surface in the circumferential direction, which has resulted in that heating is not performed for a half or more of an area of the side surface. This has led to the problems in that preheating the battery cells has been time-consuming, and that a large amount of power has been required.

In view of the foregoing background, it is therefore an object of the present disclosure to provide a power storage module capable of efficiently preheating the power storage device in a short time and with a small amount of power.

Solution to the Problem

A power storage module of the present disclosure includes: a plurality of power storage devices formed into a tube-like shape; and a sheet-like heating element for heating the plurality of power storage devices, wherein each of the plurality of power storage devices has a tube-like case, the plurality of power storage devices are arranged such that central axes of the cases are parallel to each other, the heating element has a plurality of contact portions that are in continuous contact with side peripheral surfaces of the plurality of power storage devices, and a wrap angle of the plurality of contact portions with respect to the power storage devices is greater than 180°.

Advantages of the Invention

Since the sheet-like heating element is in contact with the side peripheral surface of the power storage device at a wrap angle of greater than 180°, it is possible to increase the area of contact between the power storage device and the heating element, as compared to a known power storage module. For this reason, the heating element can efficiently heat the power storage device in a short time.

DESCRIPTION OF EMBODIMENTS

Figure 1:
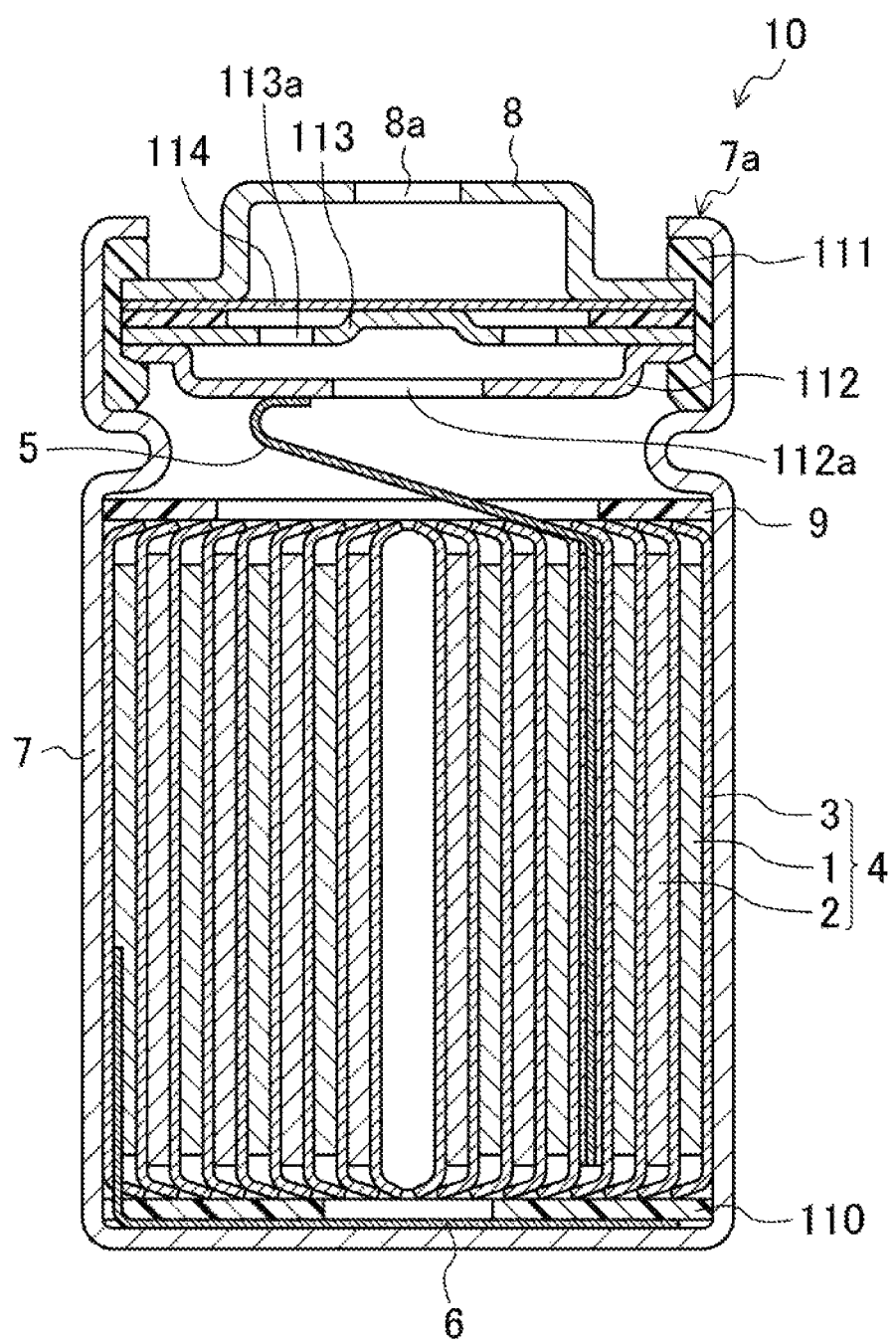
FIG. 1 is a schematic cross-sectional view of a power storage device.

Embodiments of the present disclosure are described below with reference to the drawings. The following description of the embodiments is merely exemplary in nature and is not intended to limit the present disclosure, its application, or its uses. In the drawings below, constituent features substantially sharing the same function are denoted with the same reference characters for the sake of simplicity.

First Embodiment

FIG. 1 is a cross-sectional view schematically illustrating a configuration of a power storage device 10 using a power storage module 100 of a first embodiment of the present disclosure.

For example, a cylindrical lithium ion secondary battery such as that shown in FIG. 1 can be employed as a power storage device 10. The power storage device of the present disclosure may be a secondary battery such as a nickel-hydrogen battery or a capacitor. Hereinafter, the configuration of the power storage device 10 will be described with reference to FIG. 1 in details.

As shown in FIG. 1, an electrode group 4, in which a positive electrode 2 and a negative electrode 1 are wound via a separator 3, and a nonaqueous electrolyte solution are housed in a cylindrical case 7 made of metal. Insulating plates 9 and 110 are arranged above and below the electrode group 4. The positive electrode 2 is joined to a metal filter 112 via a positive electrode lead 5, and the negative electrode 1 is joined to the bottom of the case 7 serving also as a negative electrode terminal via a negative electrode lead 6.

The filter 112 is connected to a metal inner cap 113, and a protruding portion of the inner cap 113 is joined to a metal valve plate 114. Further, the valve plate 114 is connected to a metal terminal plate serving also as a positive electrode terminal 8. The terminal plate, the valve plate 114, the inner cap 113, and the filter 112 are integrally configured to seal an opening of the case 7 via a gasket 111. The case 7 is placed on the upper end of the gasket 111 and presses the gasket 111 down, thereby firmly sealing the opening of the case 7. An upper end portion (negative electrode terminal 7a) of the battery case 7 placed on the upper end of the gasket 111 is positioned adjacent to the terminal plate (positive electrode terminal 8). The positive electrode terminal 8 and the negative electrode terminal 7a are provided at one end in the axial direction of the cylinder (upper side in the drawing). Since the negative electrode terminal 7a is a part of the case 7, a side surface portion (side peripheral surface) of the case 7 formed into a tube-like shape is also electrically connected to the negative electrode terminal 7a.

When an internal short circuit or the like occurs in the power storage device 10 and the pressure inside the power storage device 10 increases, the valve body 114 expands toward the terminal plate. When the inner cap 113 and the valve body 114 are disconnected from each other, the current path is cut off. When the pressure in the power storage device 10 further increases, the valve body 114 breaks. Accordingly, gas generated in the power storage device 10 is discharged to the outside through a through hole 112a of the filter 112, a through hole 113a of the inner cap 113, an aperture of the valve body 114, and an opening portion 8a of the terminal plate.

Note that a safety mechanism for discharging gas generated in the power storage device 10 to the outside is not limited to the structure shown in FIG. 1, and may have another structure.

<Power Storage Module>

Figure 2:
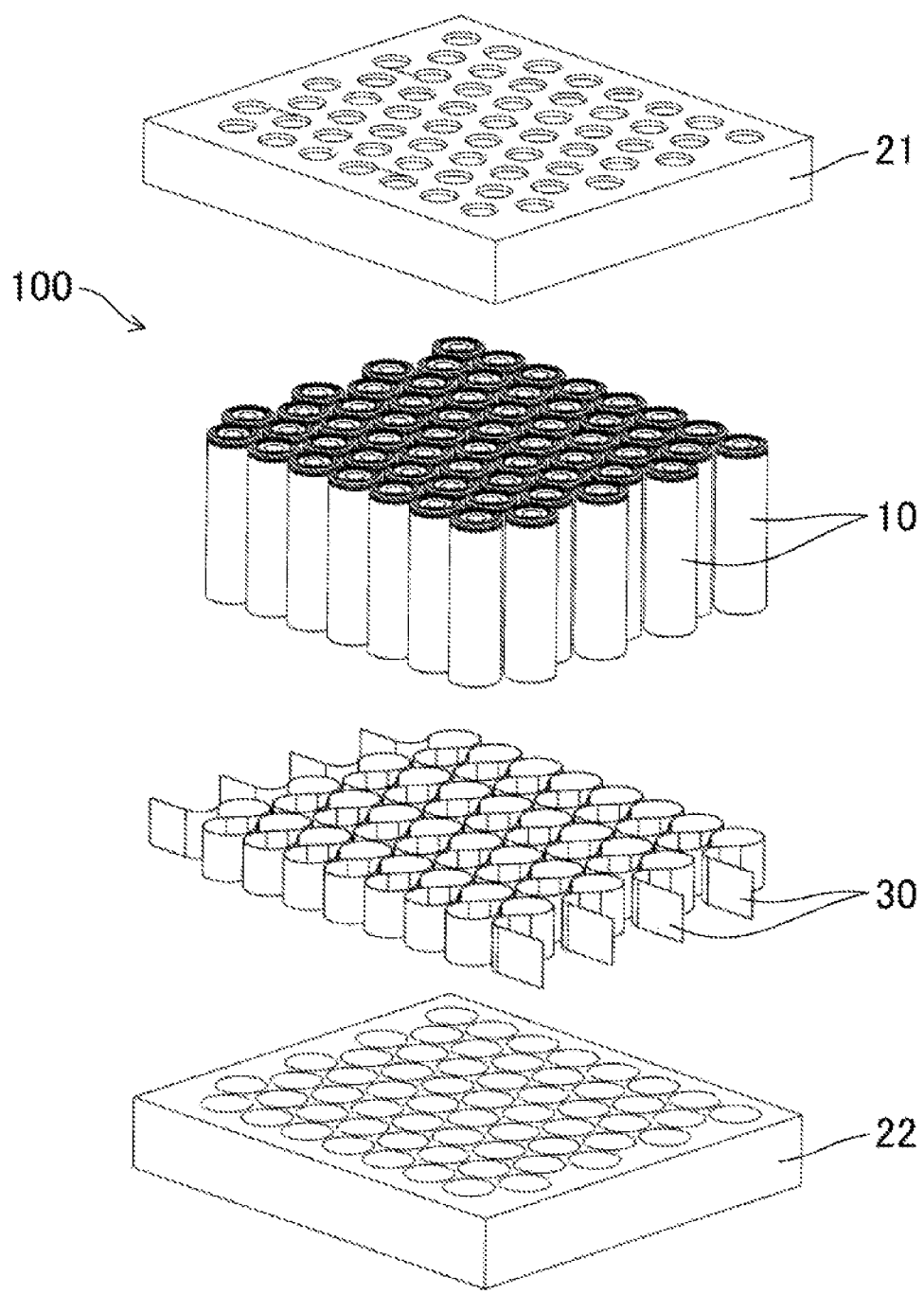
FIG. 2 is a schematic exploded perspective view of a power storage module of an embodiment.

FIG. 2 is a schematic exploded perspective view of the power storage module 100 of the first embodiment. The plurality of power storage devices 10 are arranged such that the central axes of the cases 7 (axes parallel to the side surfaces of the cylinders) are parallel to each other and the side surfaces are adjacent to each other. When the power storage module 100 is viewed on a plane perpendicular to the central axis of each case 7, the plurality of power storage devices 10 are not in contact with each other, but are arranged to be tightly packed (six power storage devices 10 are arranged to surround one power storage device 10, thereby forming a regular hexagonal shape). Note that the arrangement of the power storage devices in the power storage module of the present disclosure is not limited to the above arrangement. The number of other power storage devices equidistant from one predetermined power storage device may be four or three. The plurality of power storage devices 10 are provided in eight rows, arranged side by side on a straight line, on a plane perpendicular to the central axes of the cases 7. The power storage devices 10 in adjacent rows are arranged parallel to each other, and the central axis of the power storage device 10 in one row is positioned between the central axes of two adjacent power storage devices 10 in the adjacent row. In the power storage module 100, there are two types of the number of power storage devices 10 belonging to one rows; For example, seven and eight.

A first holder 21 and a second holder 22 holding the plurality of power storage devices 10 arranged as described above are disposed on the upper end side (terminal plate side) and the lower end side (bottom side of the case 7) of the power storage devices 10. The first holder 21 is provided with a plurality of circular holes corresponding to the shape of the upper end side of the power storage device 10. The upper end side of the power storage device 10 is fitted into the hole. The second holder 22 is provided with a plurality of circular holes corresponding to the shape of the lower end side of the power storage device 10. The lower end side of the power storage device 10 is fitted into the hole. The first holder 21 and the second holder 22 may be made of an electrically insulating member. The first holder 21 and the second holder 22 may be made of metal material as far as they can be electrically insulated from the power storage devices.

The ratio of the length, along the central axis, of the portion of the power storage device 10 fitted into the first holder 21 with respect to the entire length of the power storage device 10 may be 10% or more and 30% or less of the entire length of the power storage device 10. The length, along the central axis, of the portion of the power storage device 10 fitted into the second holder 22 may be 10% or more and 30% or less of the entire length of the power storage device 10.

A sheet-like heating element 30 is in contact with the side surface of each power storage device 10 exposed from between the first holder 21 and the second holder 22. As will be described later, the sheet-like heating element 30 is in contact with a half or more of the side surface of each power storage device 10 in the circumferential direction (wrap angle is greater than 180°). One heating element 30 is arranged to be in contact with the power storage devices 10 in order (or in reverse order). The ratio of the length, along the central axis, of the portion of each power storage device 10 exposed from between the first holder 21 and the second holder 22 with respect to the entire length of the power storage device 10 is preferably 40% or more and 80% or less of the entire length of the power storage device 10. The width of the heating element 30 is also 40% or more and 80% or less of the entire length of the power storage device 10.

<Heating Element>

Figure 8:
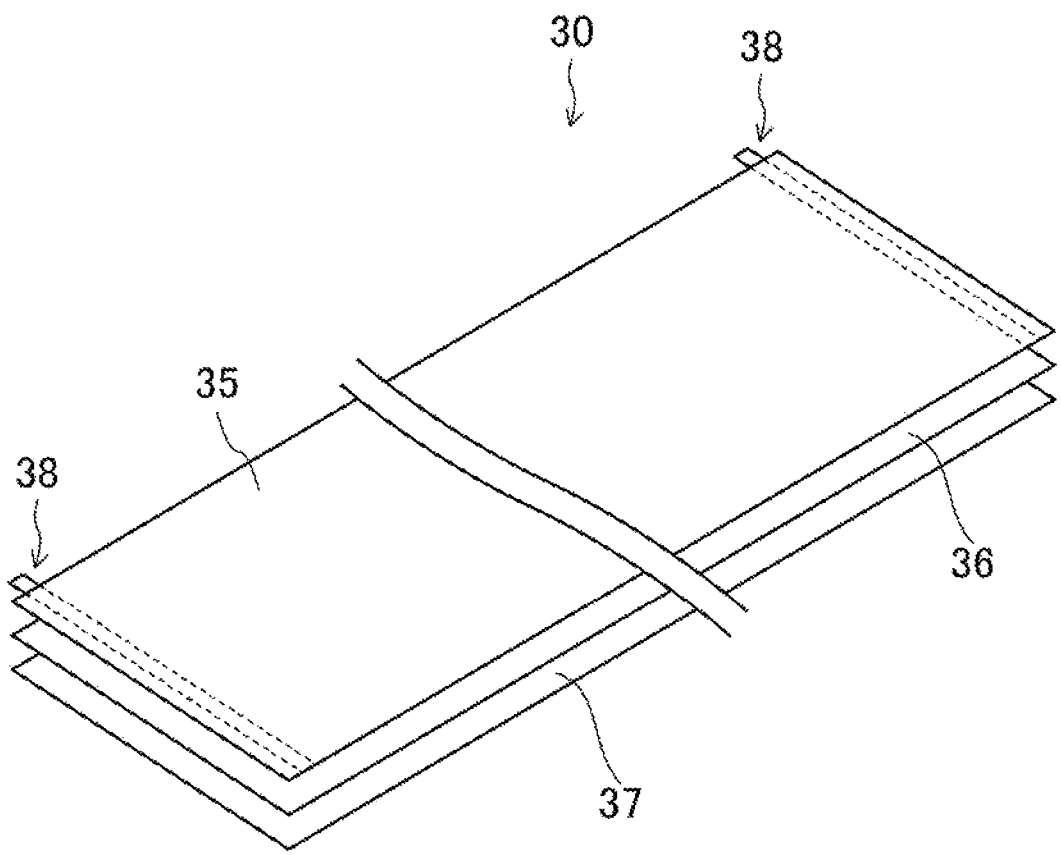
FIG. 8 is a schematic exploded perspective view of a heating element.

The heating element 30 is a flexible sheet that breaks when its temperature increases to greater than 80° C. As shown in FIG. 8, examples of specific configurations of the heating element 30 include a structure in which a conductive heating layer (heating member) 36 is interposed between two electrically insulating resin sheets 35 and 37 that break at the temperature of higher than 80° C. These resin sheets may have a melting temperature exceeding 80° C. However, the sheets may soften when the temperature of 80° C. is reached and the glass transition point is exceeded, or shrink to break.

The two electrically insulating resin sheets 35 and 37 serving as the surfaces of the heating element 30 may be made of a synthetic resin such as polyethylene, polypropylene, polyester, polystyrene, acrylic, or vinyl chloride.

Examples of the conductive heating layer 36 may include an ITO film, a metal film, a carbon layer (a layer made of carbon powder or carbon nanotubes and a binder), and a conductive resin layer. Such a heating layer 36 can be broken together with the two resin sheets 35 and 37 when they break. The metal film is formed on the surface of one of the resin sheets 35 and 37 by, for example, vapor deposition or sputtering, and is an assembly of a number of fine metal particles supported by the resin sheets 35 and 37 as base material. The conductive resin layer can be obtained by applying a solution of a conductive polymer such as polythiophene-based solution and drying the solution thus applied. The conductive heating layer 36 may be a layer made of fine conductive particles and a binder. Not all of the heating layers included in the heating element need to be formed by the above-mentioned materials. For example, the region of the heating layer that is in contact with the cylindrical cell may be a sheet body capable of self-supporting such as a metal foil. One of the power storage devices 10 contacting the heating element and another of the power storage devices 10 contacting the same heating element after (or before) the one power storage device 10 may merely share, at at least a site, the breaking portion that extends in the width direction of the heating element and is made of the above material. With the breaking portion partially provided in the heating layer, a portion to be broken in the heating layer is easily set. Further, the heating layer may be a sheet body capable of self-supporting as long as it is breakable at a predetermined temperature. In addition, in the non-contact portion of the heating element, the heating layer may be formed to be partially deficient in the width direction. According to this configuration, the deficient portion in the non-contact portion becomes thermally resistant, and heat is less likely to be transferred to another power storage device via the non-contact portion in a case in which the temperature in the power storage device increases abnormally.

Electric power is supplied to the heating element 30 to make the heating element 30 generate heat, and an electrode 38 that receives the power supply is installed at an end portion in the longitudinal direction of the heating element 30. With this arrangement, it is less likely for the electrode 38 to break due to the heating element 30 reaching a high temperature, and the heating element 30 can stably break, as compared to a configuration in which an electrode is provided at an end portion in the width direction of the heating element 30. The electrode 38 may be made of a metal layer, a metal foil, a metal plate or a metal wire that is thicker than the foil, conductive carbon, or the like.

The heating element 30 is a belt-like long body having a width of 40% or more and 80% or more of the entire length of the power storage device 10. The surface in contact with the power storage device 10 is made of a member having insulating properties, and has a heating layer in a central portion in the thickness direction. Note the following: In a case in which a conductive resin is used as the heating layer, even if the conductive resin is formed into a sheet-like shape, the heating element 30 can be melt and cut since the conductive resin gets broken when an abnormality occurs inside a power storage device 10 to cause a temperature increase. Thus, it is possible to suppress transference of the heat generated by the heating element 30 from one of the power storage devices 10 to the adjacent one of the power storage devices 10 with which the heating element 30 is in continuous contact, thereby making it possible to reduce the risk of a temperature increase in the adjacent power storage device 10. The heating element 30 may have a portion that is not in contact with the power storage device 10, and will be melt and cut when the portion reaches the temperature of greater than 80° C. The heating element 30 may be a conventional heating element having a heating layer made of a metal foil or a conductive wire and may break before the heating layer reaches the temperature at which it will be melt and cut. Therefore, the heating element 30 may break at a temperature of lower than 600° C., or at a temperature of lower than 400° C. Further, the heating element 30 may break at a temperature equal to or lower than a temperature at which the base resin supporting the particles contained in the heating layer melts.

The thinner the heating element 30 is, the smaller the distance between the adjacent power storage devices 10 can be, which leads to a larger filling ratio of the power storage devices 10 can be. For example, it may be $\frac{1}{10}$ to $\frac{1}{4}$ of the minimum value of a gap distance between the adjacent power storage devices 10 (the gap distance on the line connecting the centers of the adjacent power storage devices). In addition, the thickness is preferably small since flexibility is likely to improve. The degree of flexibility of the heating element 30 may be equal to or greater than a degree at which the heating element 30 bends along the side peripheral surface of the power storage device 10 and maintains its shape when assembled as a power storage module, or may be a degree at which the heating element 30 is in close contact with the side peripheral surface.

In this embodiment, a plurality of heating elements 30 are provided. Electric power may be supplied to the heating elements 30 from its corresponding power storage module or from a separate power storage device or a separate power storage module.

<Arrangement of Power Storage Device and Heating Element>

Figure 3:
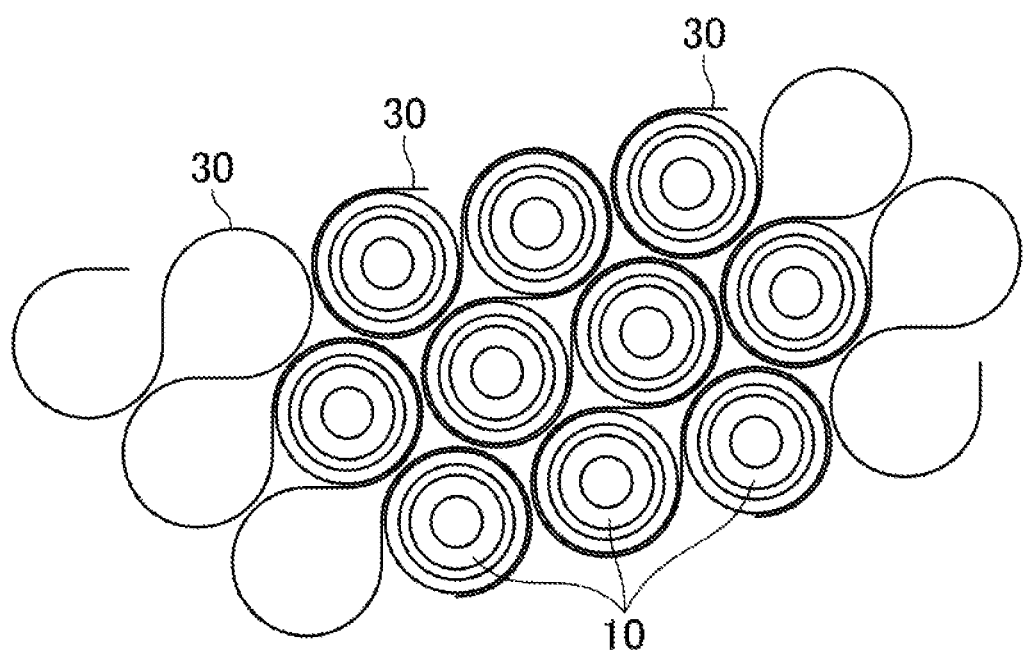
FIG. 3 is a schematic view showing a part of the inside of the power storage module of the embodiment, as viewed from above.
Figure 4:
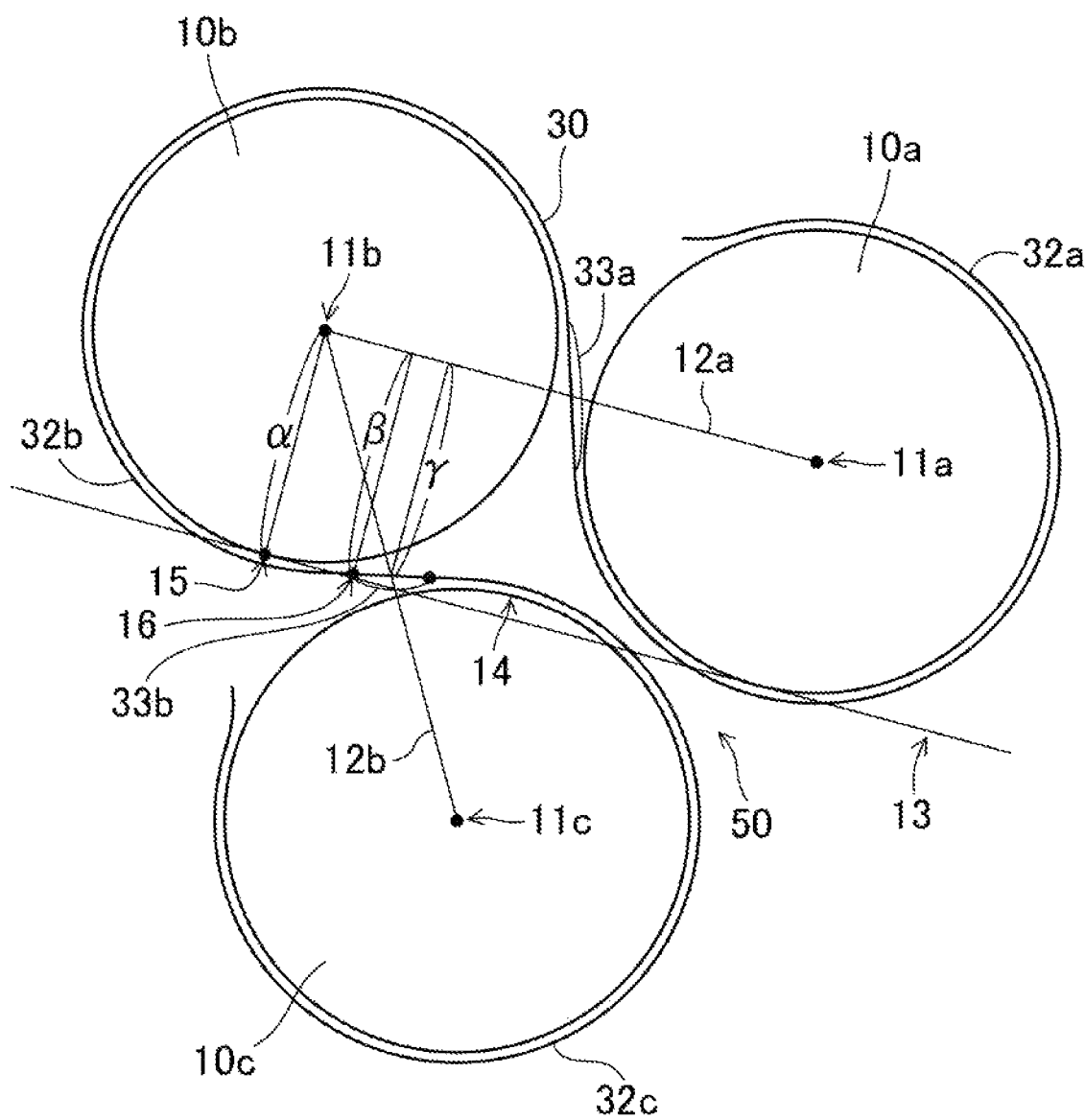
FIG. 4 is an enlarged schematic view showing only three of the adjacent power storage devices of the components shown in FIG. 3.
Figure 5:
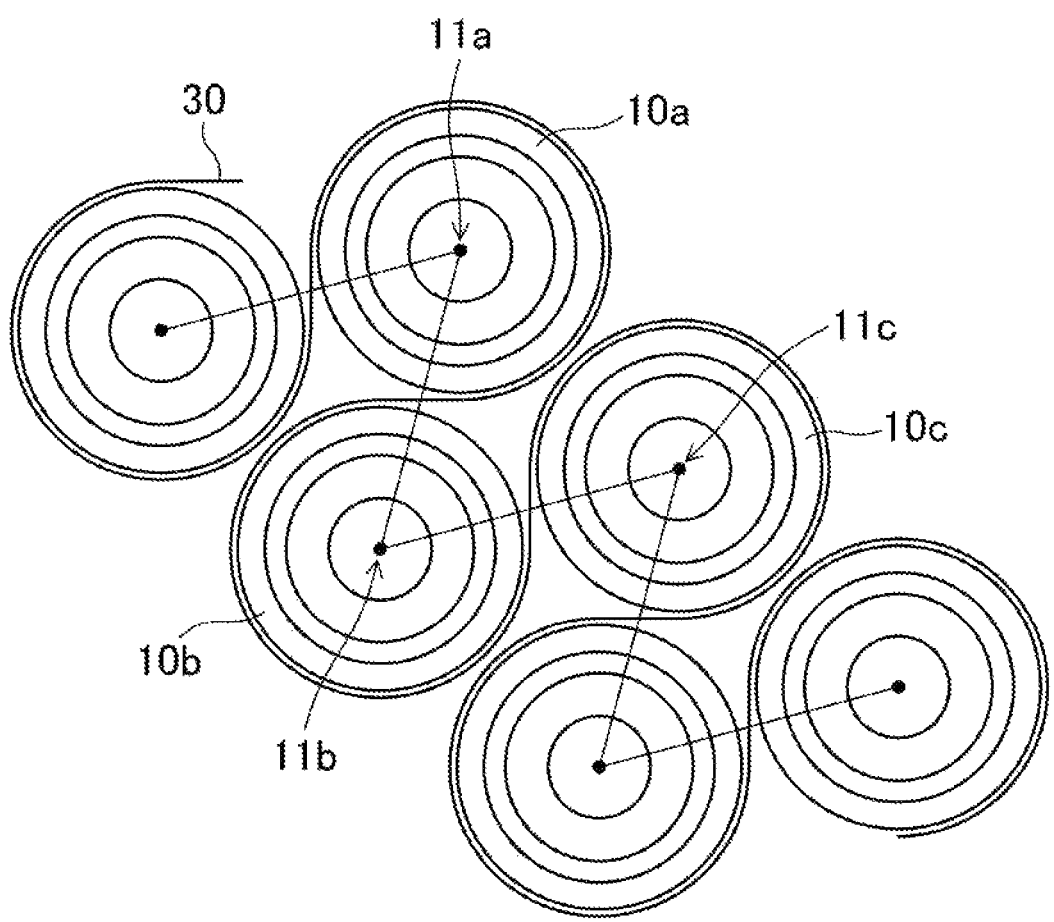
FIG. 5 is a schematic view showing a part of the components shown in FIG. 3.

FIG. 3 is a view showing a part of the inside of the power storage module 100 of the present embodiment (a part of the power storage devices 10 and a part of the heating elements 30) as viewed from above along the central axis of the power storage device 10. FIG. 5 is a view showing a part taken out of FIG. 3. FIG. 4 is a view schematically showing three adjacent power storage devices 10 of FIG. 3.

The power storage devices 10 are arranged such that adjacent six power storage devices 10 surround the respective power storage devices 10 with lateral surfaces being adjacent to one another to form a regular hexagonal shape. With this arrangement, the power storage devices 10 are tightly packed in the power storage module in a state in which the power storage devices are kept from contacting one another. The central axes of the power storage devices 10 adjacent to each other are arranged in a substantially regular triangular shape viewed on a virtual plane perpendicular to the central axes. More specifically, the central axes of the power storage devices 10 are arranged such that intersections of the respective central axes and the virtual plane are connected by lines to form a substantially regular triangle. The heating element 30 is wound around and in contact with the side peripheral surface of each power storage device 10 by a degree that is slightly less than 300°. That is, the wrap angle of the heating element is slightly less than 300°.

As shown in FIGS. 4 and 5, the heating element 30 is in contact with a first power storage device 10a, a second power storage device 10b, and a third power storage device 10c, in this order (or in reverse order). The heating elements 30 extends in a direction different from that of a line (first straight line) 12a connecting a central axis (first central axis) 11a of the first power storage device 10a with a central axis (second central axis) 11b of the second power storage device 10b, and that of a line (second straight line) 12b connecting the central axis 11b of the second power storage device 10b with a central axis (third central axis) 11c of the third power storage device 10c. These two lines form an angle of, for example, about 60°. However, the angle formed by these two lines is not limited to about 60°. Note the following: The line connecting the two center axes mentioned above means, specifically, a line connecting the intersections formed between each central axis and the virtual plane with respect to the virtual plane perpendicular to the two central axes. Therefore, the first straight line 12a and the second straight line 12b forming the angle are straight lines formed on the same virtual plane.

When a tangent line 13 that is parallel to the first straight line 12a and in contact with the second power storage device 10b is drawn on a plane (virtual plane) shown in FIG. 4, a part 14 of the side peripheral surface (third side peripheral surface), which is obtained by cutting the side surface of the third power storage device 10c by the virtual plane, exists between the first straight line 12a and the tangent line 13. However, as will be described later, the adjacent power storage devices 10 are arranged such that they do not come in contact with each other, and that the heating elements 30 in contact with the power storage devices 10 are kept from being in contact with each other.

The heating element 30 includes a first contact portion 32a in contact with the side peripheral surface (first side peripheral surface) of the first power storage device 10a, a second contact portion 32b in contact with the side peripheral surface (second side peripheral surface) of the second power storage device 10b, and a third contact portion 32c in contact with the side peripheral surface (third side peripheral surface) of the third power storage device 10c. The heating element 30 also includes a first non-contact portion 33a and a second non-contact portion 33b which are not in contact with the power storage device 10. In FIG. 4, the first non-contact portion 33a exists between the first contact portion 32a and the second contact portion 32b. The second non-contact portion 33b exists between the second contact portion 32b and the third contact portion 32c. The non-contact portion of the heating element 30 means a portion of the strip-shaped heating element 30 where the power storage device 10 is not in contact with either the front surface or the back surface of the heating element 30.

Regarding a contact point 15 between the tangent line 13 and the second power storage device 10b, when a distance between the contact point 15 and the first straight line 12a is set as a distance α, the distance α is equal to the radius of the second power storage device 10b. Further, an end portion 16 of the second contact portion 32b on the side close to the third contact portion 33c, that is, the boundary between the second contact portion 32b and the second non-contact portion 33b is located closer to the first straight line 12a than the contact point 15 since the part 14 of the side peripheral surface of the third power storage device 10c is closer to the first straight line 12a than to the tangent line 13. Therefore, a distance β between the end portion 16 and the first straight line 12a is smaller than the distance α. For the same reason, the second non-contact portion 33b is also located closer to the first straight line 12a than to the contact point 15. Therefore, a distance γ between the second non-contact portion 33b and the first straight line 12a is smaller than the distance α.

In a region 50 where the first power storage device 10a and the third power storage device 10c are adjacent to each other, the back surfaces of the contact surfaces of the first contact portion 32a and the third contact portion 32c face each other, but are not in contact with each other and are spaced away from each other. When the first contact portion 32a and the third contact portion 32c are in contact with each other in the region 50, and the temperature of one of the first power storage device 10a and the third power storage device 10c becomes abnormally high, there is a risk that heat is actively transferred from the one power storage devices to the other power storage device via the first contact portion 32a and the third contact portion 32c that are in contact with each other. To address this problem, the first contact portion 32a and the third contact portion 32c are spaced away from each other. Accordingly, the risk of such transference of heat is reduced.

As shown in FIG. 5, in the present embodiment, the heating element 30 is wound from the first power storage device 10a to the adjacent second power storage device 10b and further to the adjacent third power storage device 10c in a continuous manner, where the first power storage device 10a and the third power storage device 10c are arranged adjacent to each other. That is, the first power storage device 10a, the second power storage device 10b, and the third power storage device 10c are arranged such that their central axes 11a, 11b, and 11c form a regular triangle. Therefore, the heating element 30 is wound around (brought into contact with) the side peripheral surface of one power storage device 10, then extends from the power storage device 10 to an adjacent power storage device 10, and is wound around the side peripheral surface of the adjacent power storage device 10. The power storage devices 10 around which the heating element 30 is sequentially wound are arranged in a zigzag manner so that the angle formed by the line connecting the central axes of the adjacent power storage devices 10 is about 60°. In the power storage module 100, the power storage devices 10 with which one single heating element 30 sequentially comes into contact form a configuration in which two adjacent rows of the power storage devices 10 are arranged side by side on a straight line. The power storage module of the present embodiment has eight rows. Hence, four heating elements 30 are arranged. The number of the heating elements 30 is not limited to the foregoing number. Only a single long heating element may be arranged.

In the power storage module 100, the sheet-like heating element 30 is in contact with each power storage device 10 at the wrap angle of greater than 180°. Thus, each power storage device 10 can be quickly and efficiently preheated. Since the heating elements 30 are in contact with all the power storage devices 10 at substantially the same wrap angle, it is possible to reduce the risk of variation in the amount of heat supplied from the heating elements 30 to each power storage device 10. Further, the sheet-like heating element 30 breaks at the temperature of greater than 80° C. Accordingly, when the temperature of one of the power storage devices 10 becomes high due to an abnormality inside the power storage device to generate high heat, the heating element 30 in contact with the power storage device 10 breaks. This leads to reduction of the risk of the heat caused by an abnormality in an adjacent power storage device 10 with which the heating element 30 is in continuous contact. Therefore, it is possible to reduce the risk of successive generation of high temperature in the adjacent power storage devices 10, ensuring safety. Note the following: In the power storage module of the present disclosure, the heating element may not break when its temperature exceeds the predetermined value.

Second Embodiment

A power storage module 200 of the second embodiment is different from the power storage module 100 of the first embodiment only in the arrangement of the heating element 30 with respect to the power storage devices 10. Therefore, the differences between the first and second embodiments will be described below, and description of the elements the same as in the first embodiment will be omitted.

Figure 6:
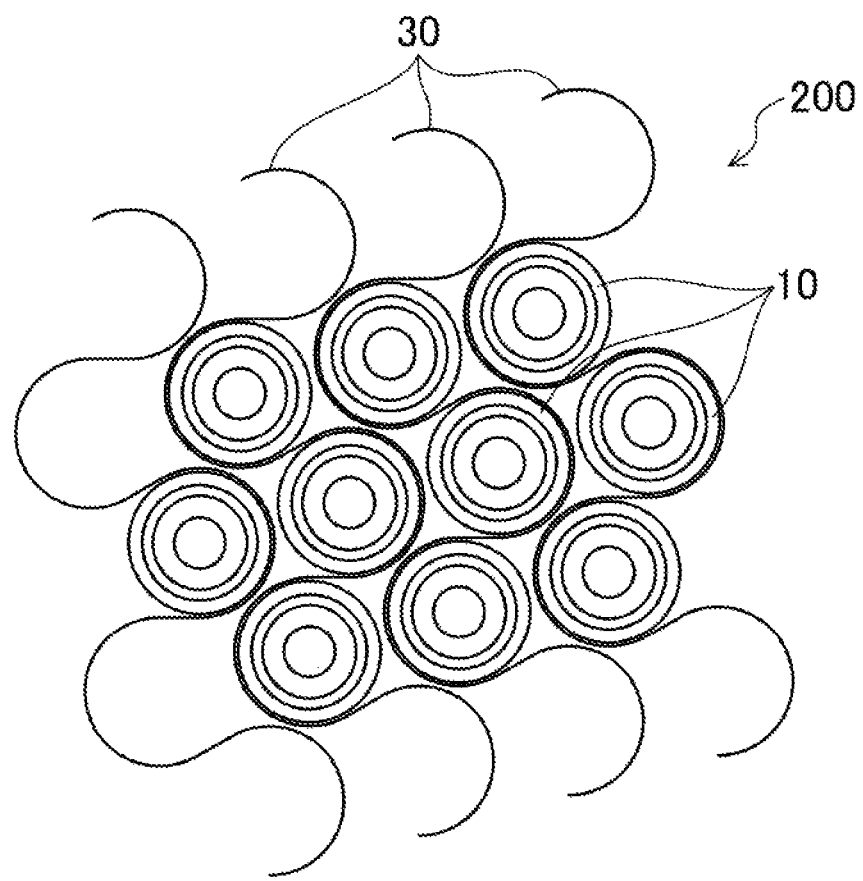
FIG. 6 is a schematic view showing a part of the inside of the power storage module of another embodiment, as viewed from above.
Figure 7:
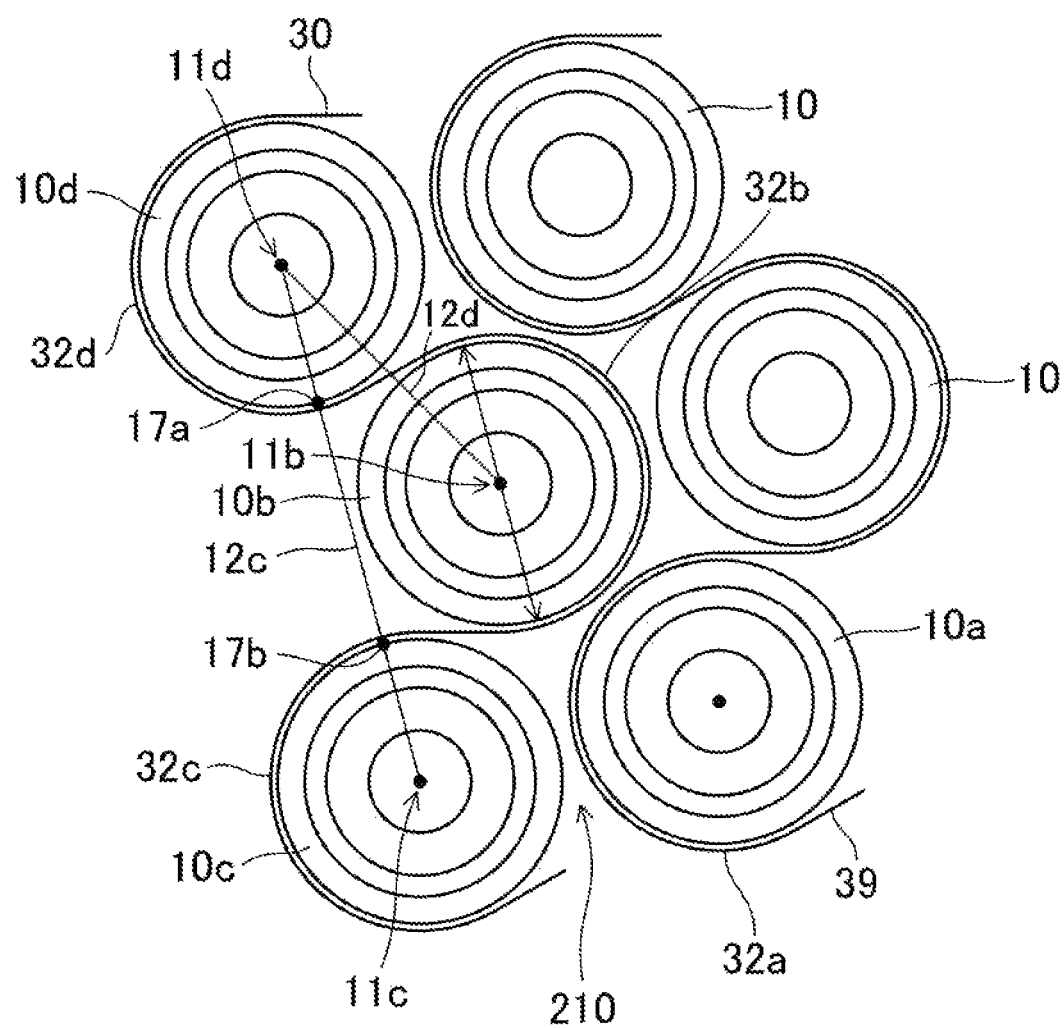
FIG. 7 is a schematic view showing a part of the components shown in FIG. 6.

FIG. 6 is a view showing a part of the inside of the power storage module 200 of the present embodiment (a part of the power storage devices 10 and a part of the heating elements 30) as viewed from above along the central axis of the power storage device 10. FIG. 7 is a view showing a part of the components shown in FIG. 6.

In the power storage module 200, the heating element 30 is in contact with another power storage device 10*d* (another contact portion 32*d*) adjacent to the second power storage device 10*b*, not with the first power storage device 10*a*. Further, the heating element 30 is in contact with the second power storage device 10*b*, and then with the third power storage device 10*c*. Another heating element 39 is in contact with the first power storage device 10*a*.

In the power storage module 200, the heating elements 30 and 39 are wound around the side peripheral surface of the respective power storage devices 10 at an angle of slightly smaller than 240°. Hence, the wrap angle is slightly smaller than 240°. Regarding the fourth power storage device 10*d*, the second power storage device 10*b*, and the third power storage device 10*c* with which the heating element 30 comes into contact sequentially in this order, the angle formed by the lines connecting three axes, that is, a fourth central axis 11*d*, a second central axis 11*b*, and a third central axis 11*c* is about 120° on the plane illustrated in FIG. 7. Therefore, the power storage devices 10 around which the heating element 30 is sequentially wound are arranged in a zigzag manner at an angle of about 120°. However, in the power storage module 200 of the present embodiment, this angle is not limited to 120°.

In a region 210 where the first power storage device 10*a* and the third power storage device 10*c* are adjacent to each other, the back surface of the first contact portion 32*a* and the side peripheral surface of the third power storage device 10*c* face each other, but are not in contact with each other and are spaced away from each other. Therefore, even if one of the first power storage device 10*a* or the third power storage device 10*c* has an abnormality so that the temperature becomes high, the risk of transference of heat generated in the one power storage device to the other power storage device is reduced. Hence, it is possible to reduce the risk of deterioration of the other power storage device caused by heat, or the risk of an occurrence of an abnormality.

In the power storage module 200, the line connecting the third central axis 11*c* with the fourth central axis 11*d* is referred to as a third straight line 12*c*, and the line connecting the fourth central axis 11*d* with the second central axis 11*b* is referred to as a fourth straight line 12*d*. The third straight line 12*c* and the fourth straight line 12*d* extend in different directions. A minimum dimension Δ of a line segment connecting a first intersection 17*a* between the third straight line 12*c* and a fourth side peripheral surface of the fourth power storage device 10*d* with a second intersection 17*b* between the third straight line 12*c* and a third side peripheral surface may be smaller than a dimension E of the second power storage device in a direction in which the third straight line extends. The heating element 30 may be arranged such that a part of the third contact portion, which is in contact with the third power storage device, 10*c* and a part of the fourth contact portion, which is in contact with the fourth power storage device 10*d*, are interposed between the third power storage device 10*c* and the fourth power storage device 10*d*. Also in the power storage module of the present disclosure with this configuration, the heating element can cover a half or more of the area of the side peripheral surface of each of the power storage devices. Therefore, the time of heating can become shorter than that of a known power storage module.

In the power storage module 200 of the second embodiment, the angle (wrap angle) formed by the contact portion of the heating element 30 and each of the power storage devices 10 exceeds 180°. Thus, as in the case with the power storage module 100 of the first embodiment, the power storage module 200 achieves an advantage of increasing the heating rate as compared to the known power storage module. Further, when the same heating element 30 as that of the first embodiment is used, even if the temperature of one power storage device 10 becomes high, it is possible to reduce the risk of successive generation of high temperature in the adjacent power storage devices 10 is suppressed, ensuring safety, as in the first embodiment.

Other Embodiments

The above embodiments are mere examples of the present disclosure. The present disclosure is not limited to these examples. Instead, the present disclosure may be a combination of a well-known art, a conventional technique, and a publicly-known technique with these examples, and may also have a part of the examples replaced. Moreover, the present invention includes modifications at which those skilled in the art would easily arrive.

The power storage device may be formed into a tube-like shape; It does not have to be cylindrical. In addition, the power storage devices included in the power storage module may be arranged in the following manner: The adjacent power storage devices is arranged such that the arrangement positions of the adjacent power storage devices are opposite to each other, and that the terminal plate of one power storage device may be electrically connected to the case of a battery of the other power storage device to obtain a serial connection.

In a case in which a plurality of power storage devices arranged are connected to each other in parallel, the bottom portions of the cases of the power storage devices may be connected to each other.

As described above, the power storage module of the present disclosure is configured to include a plurality of power storage devices formed into a tube-like shape; and a sheet-like heating element for heating the power storage devices. Each of the power storage devices has a tube-like case. The power storage devices are arranged such that central axes of the cases are parallel to each other. The heating element has a plurality of contact portions that are in continuous contact with side peripheral surfaces of the plurality of power storage devices/A wrap angle of the contact portions and the plurality of power storage devices is greater than 180°.

With this configuration, it is possible to increase the contact area between the heating element and each power storage device. Accordingly, it is possible to supply a larger amount of heat. Hence, the central axes of the cases are parallel to the sides of the cases. In addition, a plurality of sheet-like heating elements may be provided, and each heating element may be in continuous contact with side peripheral surfaces of a predetermined number of power storage devices of the power storage devices.

The power storage devices may include a first power storage device having a first central axis, a second power storage device having a second central axis, and a third power storage device having a third central axis. The first power storage device, the second power storage device, and the third power storage device may be adjacent to each other. Viewed on a virtual plane perpendicular to the first to third central axes, the first to third power storage devices may be arranged side by side such that a first straight line connecting the first central axis with the second central axis, and a second straight line connecting the second central axis with the third central axis extend in different directions. A part of a third side peripheral surface of the third power storage device may be interposed between the first straight line and a tangent line that is parallel to the first straight line and is in contact with a second side peripheral surface of the second power storage device. The contact portions of the heating element may include a second contact portion that is in contact with the second side peripheral surface and a third contact portion that is in contact with the third side peripheral surface. The heating element is in continuous contact with the first power storage device, the second power storage device, and the third power storage device, in this order.

When a distance from the first straight line to a contact point between the tangent line and the second side peripheral surface is set as a distance α, a distance β between the first straight line and a region that extends from the contact point with the second contact portion of the heating element to an end portion closer to the third contact portion may be smaller than the distance α.

The heating element may include a non-contact portion that is not in contact with the second and third power storage devices between: the second contact portion that is in contact with the side peripheral surface of the second power storage device and; the third contact portion in contact with the side peripheral surface of the third contact portion. A distance α between the non-contact portion and the first straight line may be smaller than the distance α.

In the contact portion of the heating element, a back surface of the surface in contact with the power storage device is spaced away from the other one of the power storage devices.

Between the adjacent power storage devices, the heating elements in contact with their respective power storage devices may be spaced away from each other. When a plurality of heating elements are provided in one power storage module, the same heating elements are spaced away from each other and different heating elements are also spaced away from each other.

The non-contact portion of the heating element breaks at a temperature of greater than 60° C.

The power storage devices may include a fourth power storage device having a fourth central axis, a fifth power storage device having a fifth central axis, and a sixth power storage device having a sixth central axis. Viewed on a virtual plane perpendicular to the fourth to sixth central axes, the fourth to sixth power storage devices may be arranged such that a third straight line connecting the fourth central axis with the fifth central axis, and a fourth straight line connecting the fifth central axis with the sixth central axis extend in different directions. When an intersection between the third straight line and a fourth side peripheral surface of the fourth power storage device is set as a first intersection, and an intersection between the third straight line and a fifth side peripheral surface of the fifth power storage device is set as a second intersection, a minimum dimension of a line segment connecting the first intersection with the second intersection may be smaller than a dimension of the sixth power storage device in a direction in which the third straight line extends. The heating element may include a fourth contact portion in contact with the fourth side peripheral surface, a fifth contact portion in contact with the fifth side peripheral surface, and a sixth contact portion in contact with a sixth side peripheral surface of the sixth power storage device. The sixth contact portion may be provided between the fourth contact portion and the fifth contact portion in a direction in which the heating element extends. A part of the fourth contact portion and a part of the fifth contact portion may be provided between the fourth power storage device and the fifth power storage device.

DESCRIPTION OF REFERENCE CHARACTERS

7 Case
10 Power Storage Device
10a First Power Storage Device
10b Second Power Storage Device
10c Third Power Storage Device
11a First Central Axis
11b Second Central Axis
11c Third Central Axis
12a First Straight Line
12b Second Straight Line
12c Third Straight Line
12d Fourth Straight Line
13 Tangent Line
15 Contact Point
16 End Portion Closer to Third Contact Portion in Second Contact Portion
17a First Intersection
17b Second Intersection
30 Heating Element
32b Second Contact Portion
32c Third Contact Portion
33a First Non-contact Portion
33b Second Non-contact Portion
35, 37 Resin Sheet
36 Conductive Heating Layer (Heating Member)
100 Power Storage Module
200 Power Storage Module

The invention claimed is:
1. A power storage module comprising:
a plurality of power storage devices formed into a tube-like shape;
a power supply; and
a sheet-like heating element for generating heat by receiving a current from the power supply at electrodes of the sheet-like heating element and applying the current to a conductive layer coupled to the electrodes and heating the plurality of power storage devices by the generated heat by the applied current, wherein:

each of the plurality of power storage devices has a tube-like case, the plurality of power storage devices are arranged such that central axes of the cases are parallel to each other, the heating element has a plurality of contact portions that are in continuous contact with side peripheral surfaces of the plurality of power storage devices, a wrap angle of the plurality of contact portions and the power storage devices is greater than 180°, the heating element includes a flexible resin sheet, and the conductive layer is supported on a surface of the flexible resin sheet.

2. The power storage module of claim 1, wherein the plurality of power storage devices include a first power storage device having a first central axis, a second power storage device having a second central axis, and a third power storage device having a third central axis, the first power storage device, the second power storage device, and the third power storage device are adjacent to each other, viewed on a virtual plane perpendicular to the first to third central axes, the first to third power storage devices are arranged such that a first straight line connecting the first central axis with the second central axis, and a second straight line connecting the second central axis with the third central axis extend in different directions, a part of a third side peripheral surface of the third power storage device is interposed between the first straight line and a tangent line that is parallel to the first straight line, and is in contact with a second side peripheral surface of the second power storage device, and the plurality of contact portions of the heating element include a second contact portion that is in contact with the second side peripheral surface and a third contact portion that is in contact with the third side peripheral surface.

3. The power storage module of claim 2, wherein when a distance from the first straight line to a contact point between the tangent line and the second side peripheral surface is set as a distance α, a distance β between the first straight line and a region from the contact point with the second contact portion of the heating element to an end portion on a side closer to the third contact portion is smaller than the distance α.

4. The power storage module of claim 3, wherein the heating element includes a non-contact portion that is not in contact with the second and third power storage devices between: the second contact portion that is in contact with the side peripheral surface of the second power storage device and the third contact portion in contact with the side peripheral surface of the third power storage device, and a distance γ between the non-contact portion and the first straight line is smaller than the distance α.

5. The power storage module of claim 1, wherein in the contact portion of the heating element, a back surface of a surface in contact with the power storage device is spaced away from the other power storage device.

6. The power storage module of claim 1, wherein between the adjacent power storage devices, portions of the heating element in contact with the respective power storage devices are spaced away from each other.

7. The power storage module of claim 4, wherein the non-contact portion of the heating element breaks at a temperature of greater than 80° C.

8. The power storage module of claim 7, wherein the flexible resin sheet breaks at a temperature of greater than 80° C.

9. The power storage module of claim 1, wherein the plurality of power storage devices include a fourth power storage device having a fourth central axis, a fifth power storage device having a fifth central axis, and a sixth power storage device having a sixth central axis, viewed on a virtual plane perpendicular to the fourth to sixth central axes, the fourth to sixth power storage devices are arranged such that a third straight line connecting the fourth central axis with the fifth central axis, and a fourth straight line connecting the fifth central axis with the sixth central axis extend in different directions, when an intersection between the third straight line and a fourth side peripheral surface of the fourth power storage device is set as a first intersection, and an intersection between the third straight line and a fifth side peripheral surface of the fifth power storage device is set as a second intersection, a minimum dimension of a line segment connecting the first intersection with the second intersection is smaller than a dimension of the sixth power storage device in a direction in which the third straight line extends, the heating element includes a fourth contact portion in contact with the fourth side peripheral surface, a fifth contact portion in contact with the fifth side peripheral surface, and a sixth contact portion in contact with a sixth side peripheral surface of the sixth power storage device, the sixth contact portion is provided between the fourth contact portion and the fifth contact portion in a direction in which the heating element extends, and a part of the fourth contact portion and a part of the fifth contact portion are provided between the fourth power storage device and the fifth power storage device.

10. A power storage module comprising:

a plurality of power storage devices formed into a tube-like shape; and a sheet-like heating element for heating the plurality of power storage devices, wherein:

each of the plurality of power storage devices has a tube-like case, the plurality of power storage devices are arranged such that central axes of the cases are parallel to each other, the heating element has a plurality of contact portions that are in continuous contact with side peripheral surfaces of the plurality of power storage devices, a wrap angle of the plurality of contact portions and the power storage devices is greater than 180°, the sheet-like heating element has a first main surface and a second main surface opposite to the first main surface, each of the first main surface and the second main surface contacts one or more of the plurality of power storage devices, and no portion of the first main surface and the second main surface of the sheet-like heating element contact to any other portion of the first main surface and the second main surface of the sheet-like heating element and any other sheet-like heating element.

11. The power storage module of claim 1, wherein the sheet-like heating element has a width of 40% or more and 80% or less of an entire length of the plurality of power storage devices.

12. The power storage module of claim 1, wherein:
the sheet-like heating element includes a first electric terminal and a second electric terminal, and
the first and second electric terminals are connected the conductive layer at ends of the conductive layer along a longitudinal direction of the conductive layer, respectively.

13. The power storage module of claim 12, wherein an end of each of the first and second electric terminals protrudes beyond the resin sheet in a width direction.

14. A power storage module comprising:
a plurality of power storage devices formed into a tube-like shape; and
a sheet-like heating element for heating the plurality of power storage devices, wherein:
each of the plurality of power storage devices has a tube-like case,
the plurality of power storage devices are arranged such that central axes of the cases are parallel to each other,
the heating element has a plurality of contact portions that are in continuous contact with side peripheral surfaces of the plurality of power storage devices,
a wrap angle of the plurality of contact portions and the power storage devices is greater than 180°,
the plurality of contact portions each have a back surface in contact with one of the plurality of power storage devices, and
all area of the back surface is spaced away from other back surfaces.

* * * * *